US005434894A

United States Patent [19]
Chiang et al.

[11] Patent Number: 5,434,894
[45] Date of Patent: Jul. 18, 1995

[54] REACTOR CAVITY SEAL JOINT

[75] Inventors: Chia C. Chiang, Simsbury, Conn.;
Cheryl L. Stubbs, West Springfield, Mass.

[73] Assignee: Combustion Engineering Inc., Windsor, Conn.

[21] Appl. No.: 169,358

[22] Filed: Dec. 20, 1993

Related U.S. Application Data

[63] Continuation-in-part of Ser. No. 999,340, Dec. 31, 1992, Pat. No. 5,272,732.

[51] Int. Cl.⁶ .............................................. G21C 13/028
[52] U.S. Cl. ......................................... 376/203; 376/205
[58] Field of Search ................... 376/203, 205; 138/89

[56] References Cited

U.S. PATENT DOCUMENTS

| | | | |
|---|---|---|---|
| 4,016,096 | 4/1977 | Meyer | 376/203 |
| 4,170,517 | 10/1979 | Meuschke et al. | 376/205 |
| 4,758,402 | 7/1988 | Schukei et al. | 376/205 |
| 5,102,612 | 4/1992 | McDonald et al. | 376/203 |
| 5,230,860 | 7/1993 | Behnke et al. | 376/203 |
| 5,272,732 | 12/1993 | Chiang | 376/203 |

FOREIGN PATENT DOCUMENTS

| | | |
|---|---|---|
| 0369306 | 5/1990 | European Pat. Off. |
| 4102371 | 8/1991 | Germany |
| 90-15417 | 12/1990 | WIPO |

*Primary Examiner*—Daniel D. Wasil
*Attorney, Agent, or Firm*—Ronald P. Kananen; John H. Mulholland

[57] ABSTRACT

A permanent annular ring seal and refueling deck assembly providing an effective water barrier over the annular space between a nuclear reactor vessel flange and a surrounding annular ledge includes annular platform, a support and a joint seal. The joint seal has an upper cylindrical section and a lower flexible corrugated or arcuate shaped section which accommodates radial, axial and rotational movements of the vessel, and reduces joint stress.

23 Claims, 9 Drawing Sheets

REACTOR CAVITY SEAL JOINT

CROSS REFERENCE TO APPLICATIONS

This is a continuation-in-part of U.S. application Ser. No. 07/999,340, filed Dec. 31, 1992, now U.S. Pat. No. 5,272,732. The benefits of the earlier filing date of such application is claimed under 35 U.S.C. §120.

BACKGROUND OF INVENTION

1. Field of the Invention

This invention relates to a seal for the space between an adjacent nuclear reactor vessel annular flange and a surrounding ledge or plate to provide a water barrier for supporting a liquid in a cavity called a refueling pool and, more particularly, to a permanent seal joint which is able to accommodate the radial, axial and rotational movements between the reactor vessel and the pool walls.

2. Description of Prior Art

A nuclear reactor vessel is typically positioned in a cavity or containment system. The reactor vessel is spaced from the cavity wall so as to provide an annular expansion gap and permit the reactor vessel to expand each in both a horizontal and vertical direction during cyclic heating and cooling periods of the reactor. An upper annular portion of the cavity above the vessel serves as a refueling canal or pool. The refueling pool, while maintained dry during reactor operation, is filled with water during refueling of the nuclear reactor. During refueling, the head of the reactor pressure vessel is removed and the refueling pool is filled with water.

The reactor pressure vessel has flanges which secure the head assembly to the body of the vessel. The cavity wall typically also has an edge or flange. During refueling operations, the annular gap between the reactor vessel and the pool floor must be closed tightly to prevent refueling water from entering the lower part of the reactor cavity. The seal between the reactor pressure vessel flange and the cavity wall flange serves as a floor for the body of water that is placed in the refueling pool.

Typically, this gap has been sealed using the contact seal or the gasket seal method by pressing a relatively soft material, the gasket, between the fluid passing surfaces to achieve a seal. These elastomeric seals, however, are subject to degradation and leakage. In addition, the gasket seal requires constant inspection and maintenance, which is difficult to perform in the gaskets' high dose radioactive and thermal environment and in view of the usually tight refueling schedules.

It is desirable, therefore, to provide a permanent seal which overcomes the disadvantages of the gasket seal. Attempts have been made to provide permanent seals, such as the seals described in U.S. Pat. No. 5,102,612, incorporated herein by reference and U.S. Pat. No. 4,904,442. The seal described in U.S. Pat. Nos. 4,904,442 and 5,102,612 are some type of vertically extending, straight walled inner and outer seal provided on an annular ring seal. These seals, however, are subject to high stresses and do not last as long as the life of the plant. These seals fail to accommodate the radial, axial and rotational movements between the reactor vessel and the pool floor for the life of the plant and fail to withstand the required heating and cooling cycles of the plants.

Thus it is a problem in the prior art to provide a permanent seal between the reactor vessel and pool floor which requires no maintenance or inspections, which can withstand the heating and cooling cycles of the plant, which can accommodate the radial, axial and rotational movements, between the reactor vessel and the pool floor for the life of the plant and which is not subject to leakage.

SUMMARY OF THE INVENTION

It is an object of the present invention to provide a permanent seal between the reactor vessel and the pool floor in a nuclear power plant which requires no maintenance or inspection and lasts the life of the plant.

It is a further object of the present invention to provide a seal which is not subject to degradation or leakage.

It is a further object of the present invention to provide a seal which can withstand the radioactive and thermal environment of the plant, including the heating and cooling cycles of the plant.

It is a further object of the present invention to provide a seal which can accommodate the radial, axial and rotational movements between the reactor vessel and the pool for the life of the plant.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, a permanent seal for providing an effective water barrier over an annular space between a nuclear reactor vessel flange and a surrounding annular ledge comprising: an annular space-spanning deck structure which is at least as wide as the annular gap with which it is associated; a first annular seal member for providing a seal between the deck structure and the surrounding annular ledge; and a second flexible annular seal member for providing a seal between the deck structure and the vessel flange and wherein a portion of the second seal member is straight walled and another portion of the second seal member is force absorbing. Further, the force absorbing section may be arcuate or corrugated in a manner which forms a C-shaped cross-section for example.

BRIEF DESCRIPTION OF THE DRAWINGS

The accompanying drawings, which are incorporated in, and form a part of, the specification, illustrate an embodiment of the present invention and, together with the description, serve to explain the principles of the invention. In the drawings.

DETAILED DESCRIPTION OF THE PREFERRED EMBODIMENT

Reference will now be made in detail to the preferred embodiment of the invention, an example of which is illustrated in the accompanying drawings.

Figure 1:
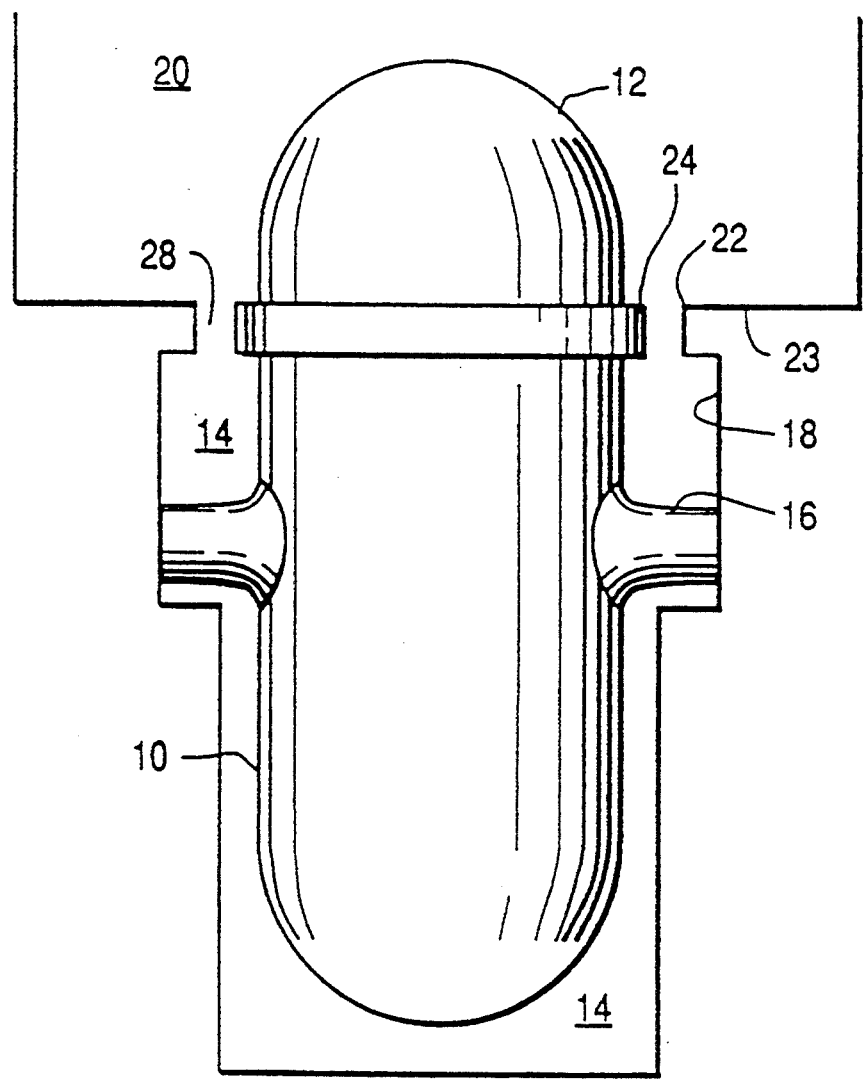
FIG. 1 is an elevational view, partly in cross-section of a reactor containment system which can incorporate a permanent cavity seal and refueling deck according to the present invention.

FIG. 1 illustrates the environment in which the preferred embodiment of the present invention is used. As shown in FIG. 1, a reactor vessel 10 having a vessel head 12 is located in a reactor vessel cavity 14 and is suspended therein by the vessel nozzles 16 which are supported within the cavity walls 18. Above the reactor vessel 10 the cavity walls 18 define a refueling canal or pool 20 having a lower boundary or pool floor 23 defining a refueling pool ledge 22 generally opposite a vessel flange 24 of the vessel 10.

Refueling of the reactor occurs periodically and consists of filling the refueling pool 20 with water, then removing the vessel head 12 from the vessel 10 so that access may be had to the nuclear fuel (not shown) inside the vessel 10. It is imperative, however, that none of the water in the refueling pool 20 leak into the vessel cavity 14 because refueling water would create contamination problems with the vessel 10 and other equipment in the vessel cavity 14. In addition, the seal must be able to accommodate the thermal expansion and contraction of the reactor vessel due to the cyclic heating and cooling periods to which the vessel is subject.

In addition, however, access to the cavity 14 must be maintained during plant operation because of safety and licensing requirements relating to hypothetical accidents which must be accommodated without damage to any components. In particular, if the vessel nozzle 16 breaks, the flashing liquid must have an escape route from the vessel cavity 14 in order to prevent excessive uplift on the vessel 10 which could further complicate an already serious accident. Therefore, the space 28 must be maintained open for ventilation and cooling during normal operations and to permit a steam flow path out of the vessel cavity 14. The space 28 may be sealed only during the reactor refueling operation. In addition access for maintenance during an outage must be provided.

Figure 2:
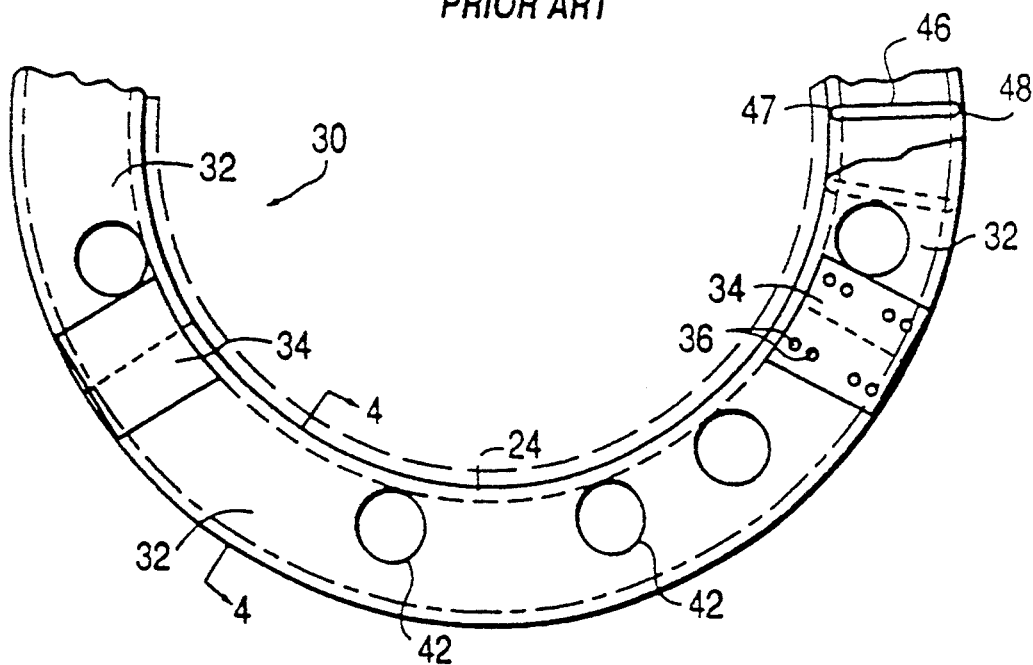
FIG. 2 is a cross-sectional top view of a portion of a cavity seal according to the prior art.
Figure 3:
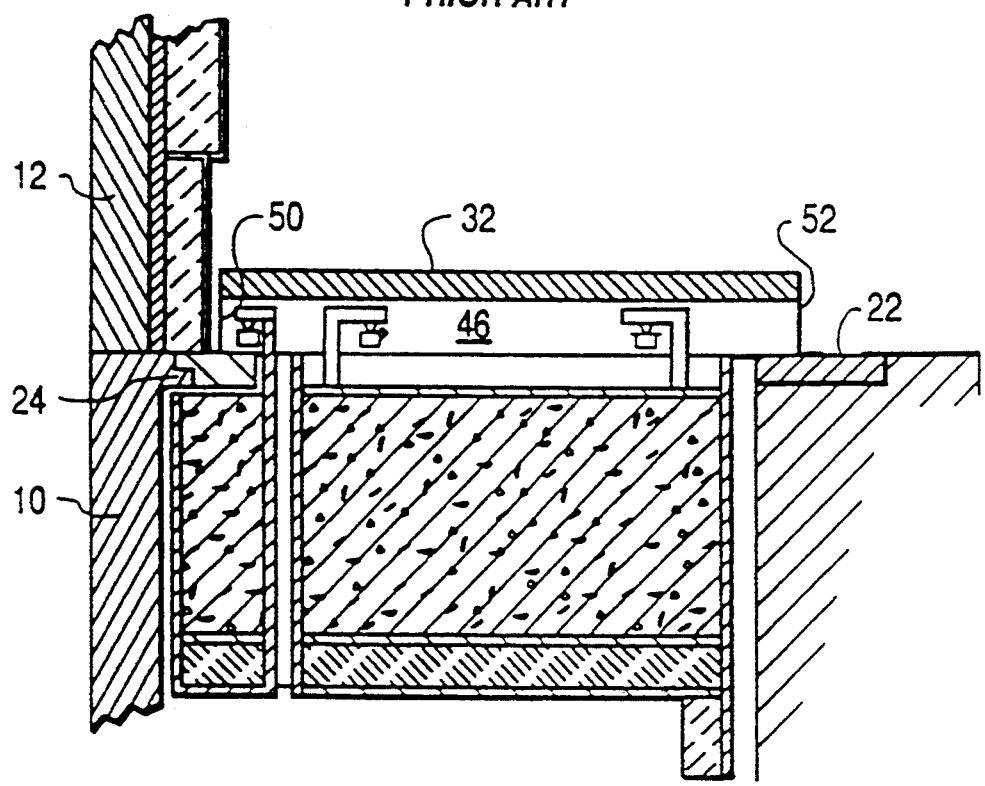
FIG. 3 is a cross-sectional view of a reactor containment system incorporates the cavity seal ring of FIG. 2 as viewed through section 4—4 thereof.

FIGS. 2 and 3 illustrate a seal of the prior art. As shown in FIG. 2 an annular seal ring is designated at 30 and includes horizontal plate or deck portions 32 for use as a work platform. The deck sections 32 are joined by splice plates 34. Threaded studs 36 and nuts (not shown) fasten the deck section 32 and plates 34 together. The plate section 32 include openings 42 with removable plugs or covers 44 (not shown). The openings 42 provide for reactor cavity cooling air flow during operation.

Radially disposed ribs or members 46 are provided, circumferentially spaced, to span the gap 28. The inner ends 47 of ribs 46 are supported by the vessel flange 24 and the outer ends 48 of the ribs 46 are supported by the ledge 22.

As shown in FIG. 3, flexible members 50 and 52 are welded to the reactor vessel flange 24 and the ledge 22 of the pool and the deck member 32 to provide a water tight seal.

Figure 4B:
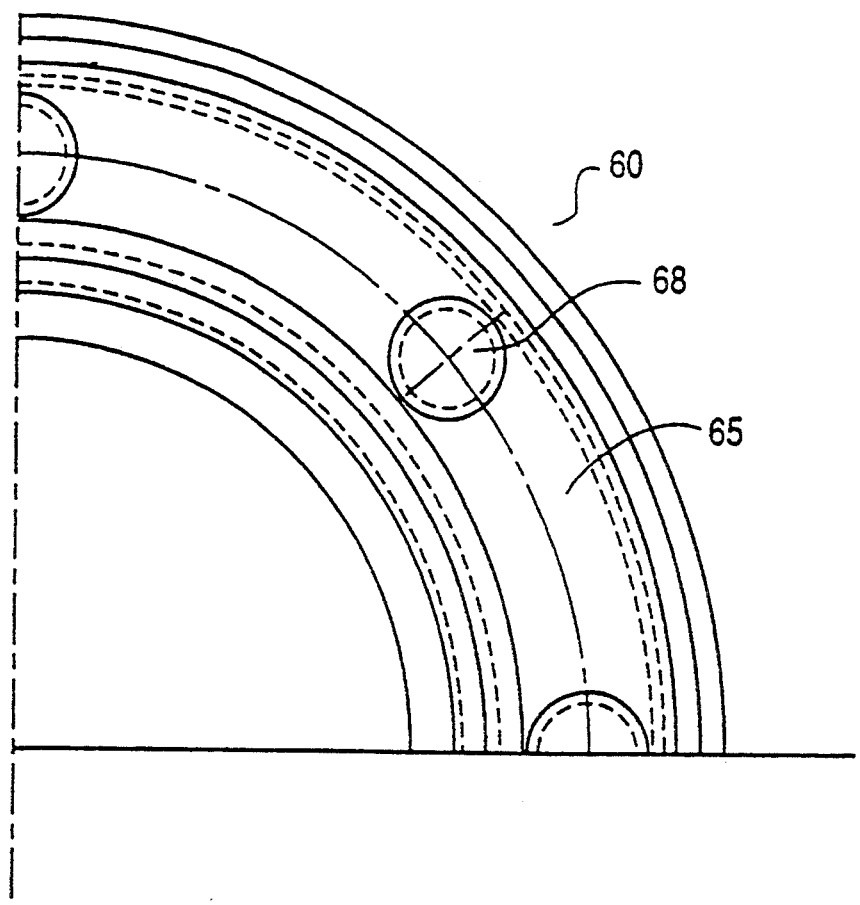
FIG. 4b is a top view of a portion of a permanent cavity seal and deck refueling assembly according to the present invention.
Figure 4A:
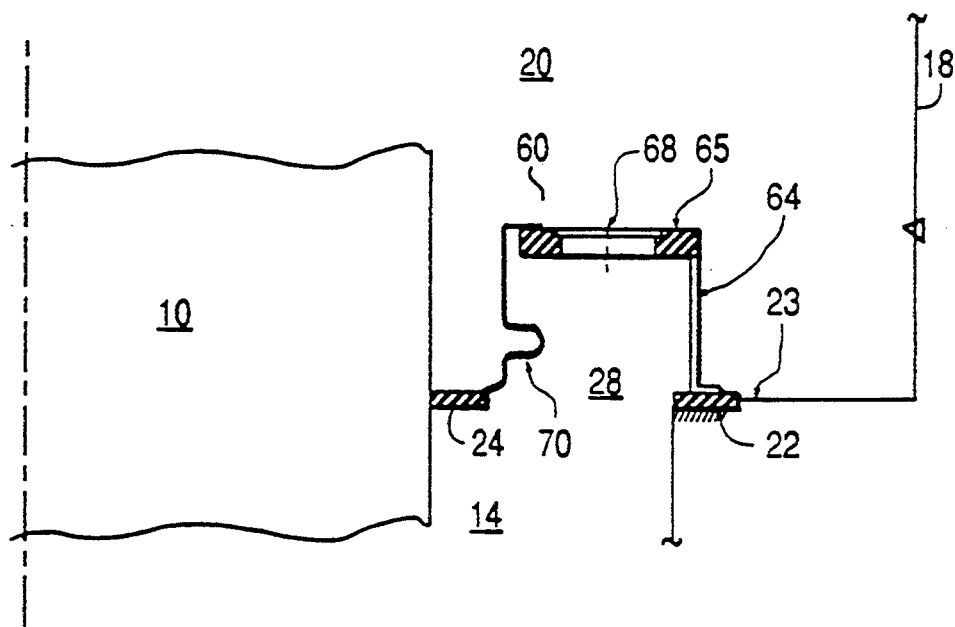
FIG. 4a is a cross-sectional view of a reactor containment system incorporating a permanent cavity seal and deck refueling assembly according to a first embodiment of the present invention.

The seal joint of the present invention is illustrated in FIGS. 4a, 4b, 5, 6 and 8. FIG. 4a shows the reactor vessel 10 with the reactor vessel refueling flange 24 in the reactor vessel cavity 14 and the refueling pool 20 having the pool floor 23 and the refueling pool ledge 22. The gap 28 between the reactor vessel 10 and the pool floor 23 and the cavity walls 18 is sealed by the annual ring seal and refueling deck assembly of the present invention illustrated generally at 60.

The seal 60 includes a support 64, a platform 65 with hatches 68 and a seal joint 70. The support 64 and the seal joint 70 are welded to the platform 65 and the pool ledge 22 and the reactor vessel flange 24. The hatches 68 may be opened during operation to provide ventilation. A top view of a portion of the annular seal 60 is illustrated in FIG. 4b.

Figure 5:
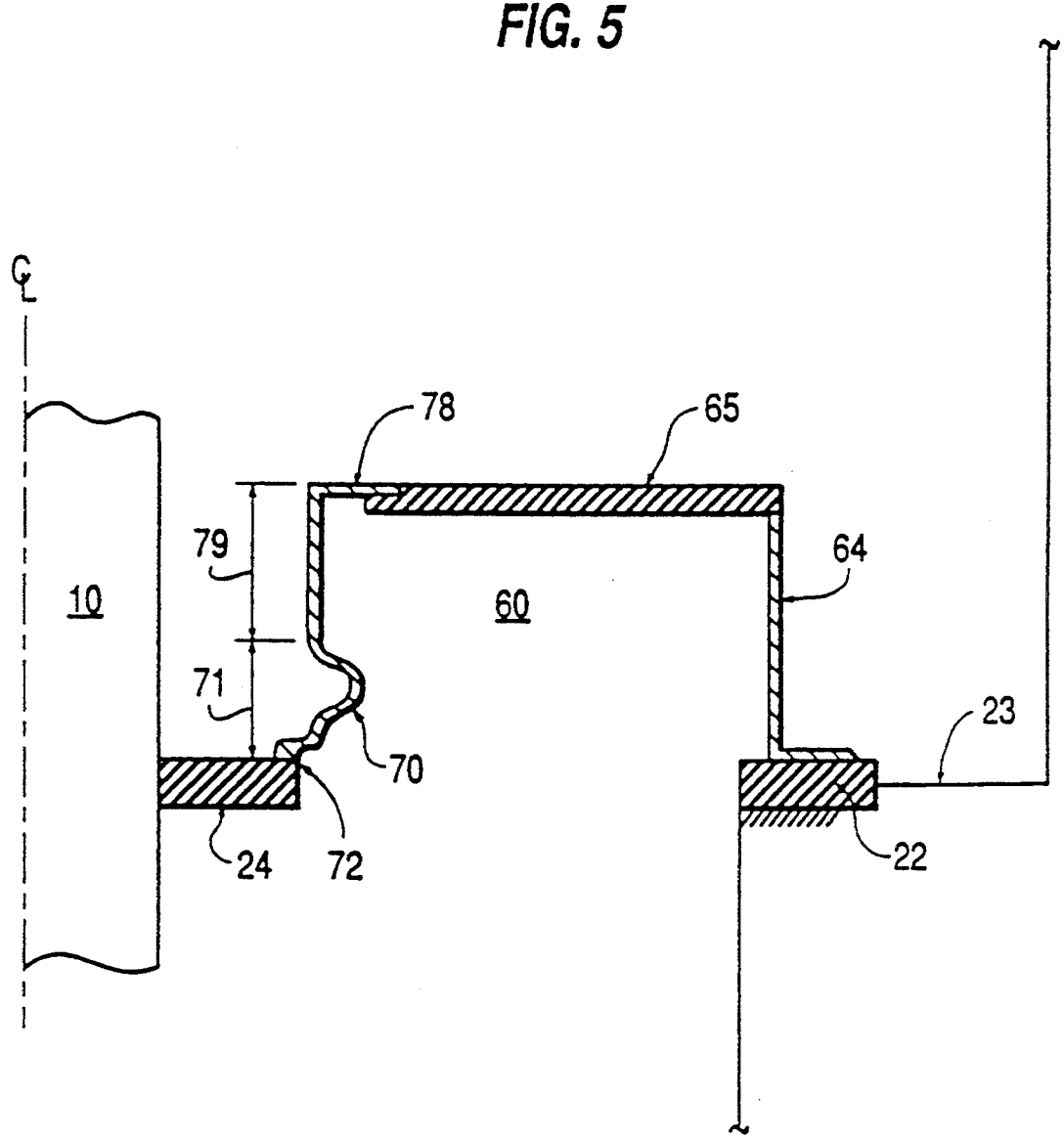
FIG. 5 is another cross-sectional view of the cavity seal according to the first embodiment of the invention.
Figure 6:
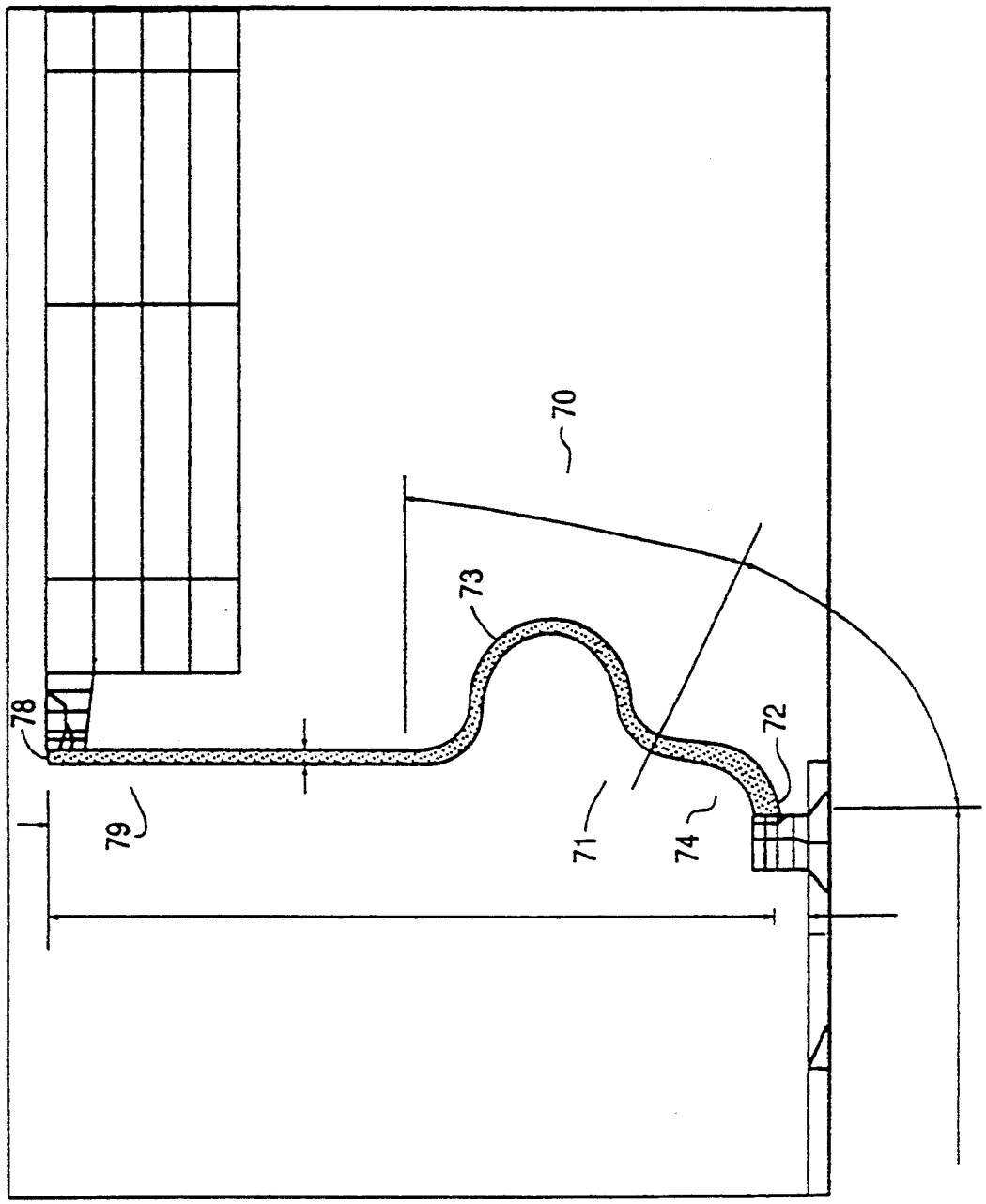
FIG. 6 is an enlarged cross-sectional joint seal of the permanent cavity seal and deck refueling assembly according to FIGS. 4 and 5.

As shown in FIGS. 5 and 6, the seal joint 70 includes and upper cylindrical section 79 and a lower flexible corrugation or arcuate section 71. The joint 70 is welded at a rim 78 of cylindrical section 79 to the platform 65 and is welded at its other end 72 to the reactor vessel flange 24. The upper section 79 forms a straight walled cylinder. The cylinder may be short or long depending on the design criteria of the plant. The lower section 71 is corrugated. The corrugated or arcuate shaped lower section 71 provides greater flexibility and absorption of forces resulting from movement of the vessel 10. The seal joint 70 is able to withstand greater forces and provide a longer seal than the seals of the prior art because of the greater structural flexibility provided by the combined properties of the arcuate sections and the upper cylindrical section of the joint. As a result, the joint stress induced by the movements of the reactor vessel is kept to a minimum. Thus, the joint 70 is able to accommodate the radial, axial and rotational movements between the reactor vessel 10 and the pool floor 23.

The present invention optimizes the fatigue usage life of the joint 70 to meet the usage life requirements of an individual plant, by proper flexibility arrangement between the corrugated section 71 and the upper cylindrical section 79. The number of corrugations, the orientation of the ends of the corrugated section 71, the width of the rim 78 for the cylindrical section 79, and the dimensions of the sections 71, 72 and 79 may vary to suit the design criteria of a specific plant.

The seal joint 70, the platform 65 and the support 64 are typically metal, preferably steel, and more preferably Type 304 stainless steel. While the specific dimensions of the joint 70 may vary depending on the design criteria of the plant, the dimensions of the seal joint 70 shown in FIG. 6 may include having the upper cylindrical section 79 between 0.1 and 0.15 inches thick, preferably 0.125 inches thick. The lower corrugated section may consist of two corrugations, section 73 may have a radius of 0.625 inches and may be made from Type 304 stainless steel, Sch. 40. While the corrugation section 74 may also have a radius of 0.625 inches, it may be made from Type 304 stainless steel, Sch. 160. The entire height of the seal joint 70 may typically be 7 to 8 inches, preferable 7.625 inches. The inner radius of the cylindrical portion of the annular seal 60 may be 109 inches.

EXAMPLE 1

Figure 7:
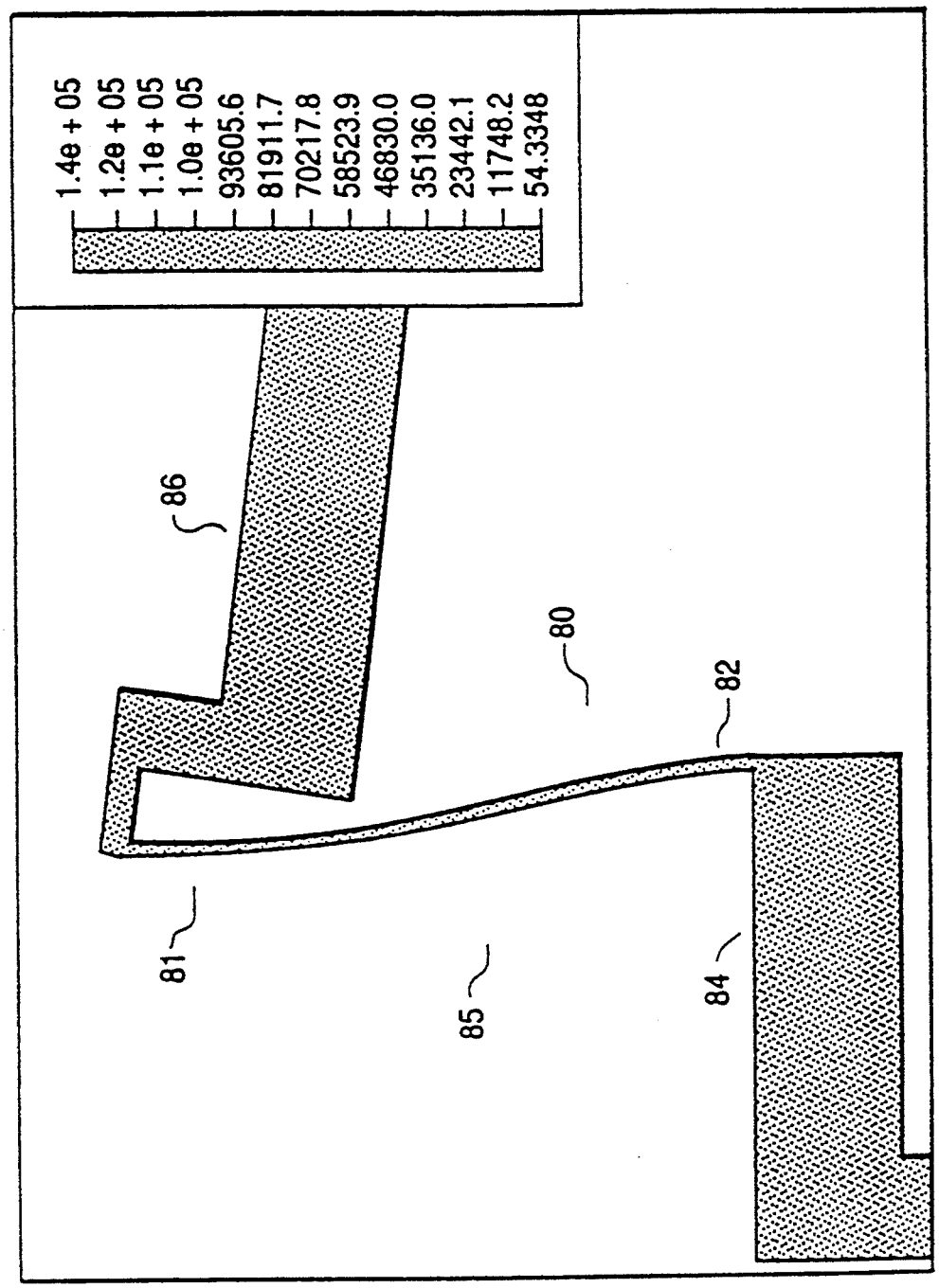
FIG. 7 is a cross-sectional view of a joint seal of a cavity seal of the prior art subject to the Finite Element analysis.

In order to demonstrate the effectiveness of the seal joint of the present invention, the seal of the prior art and the present invention were analyzed by the Finite Element analysis method and the results were compared. In FIG. 7 a membrane 85 of a seal 80 of the prior art sealed to a reactor flange 84 and a deck or platform 86 is shown. The membrane 85 is of straight cylindrical construction and is 0.125 inches thick.

Figure 8:
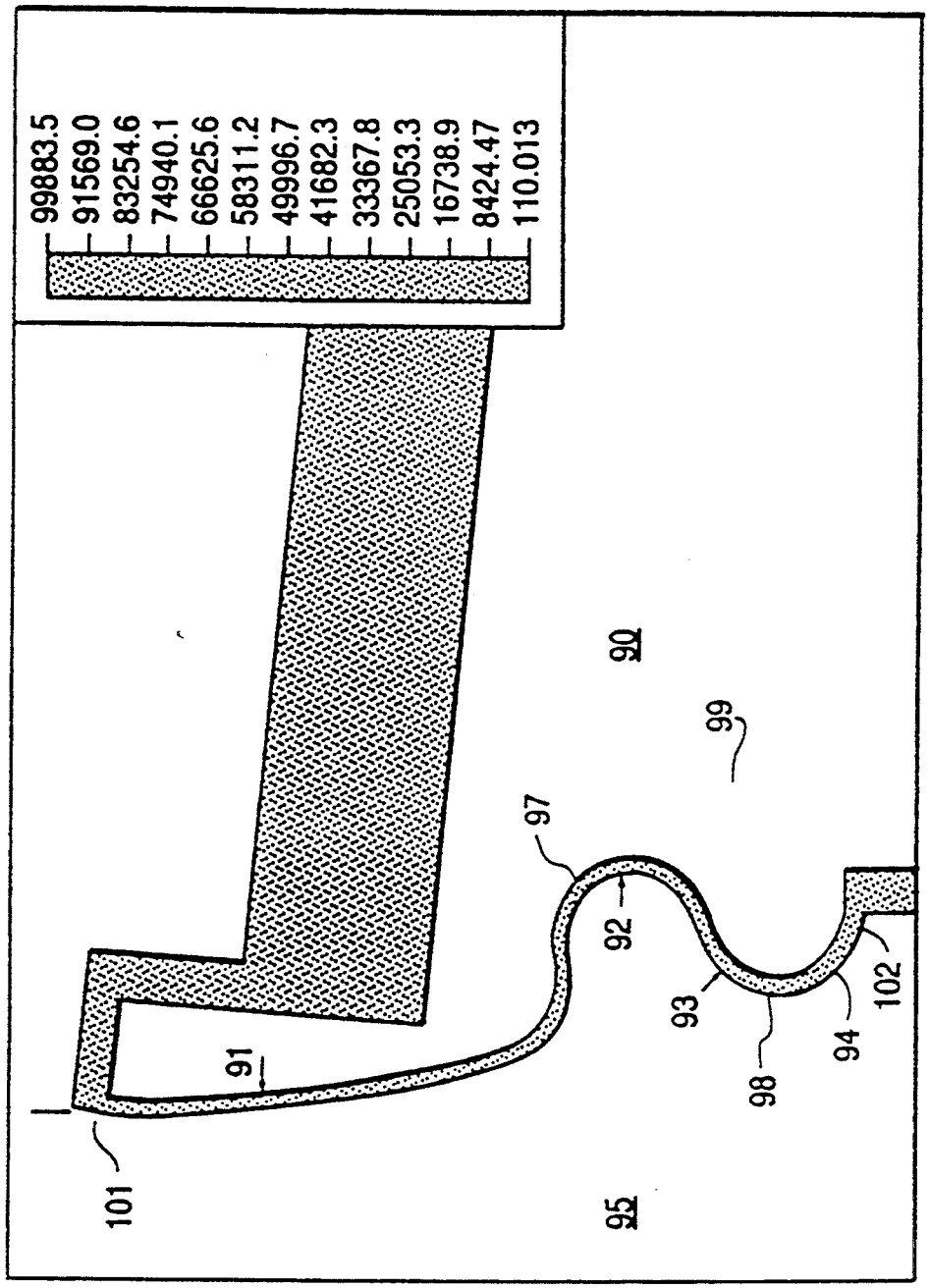
FIG. 8 is an enlarged cross-sectional view of a joint seal of a permanent cavity seal and deck refueling assembly according to the present invention subject to the Finite Element analysis.

In FIG. 8 a seal joint membrane 95 of a seal 90 of the present invention is shown. The seal joint membrane 95 in FIG. 8 has a straight cylindrical section 91 and a flexible coil section 99. The coil section 99 has two coils or arcuate portions 97 and 98 of three thicknesses. The radius of both coil sections 97 and 98 are 0.95 inches. The thickness of the section of the coil indicated at 92 is 0.145 inches, at 93 is 0.20 inches thick, and at 94 is 0.281 inches thick. The cylindrical section 91 is 0.125 inches thick.

The seal joints shown in FIGS. 7 and 8 were assumed to be installed for the same postulated refueling deck and under the same following thermal movements:

Reactor vessel Radial Movement $\Delta = 0.43$ inches; and Reactor vessel Axial Movement $\Delta = 0.70$ inches. Both joints were made from the same type 304 Stainless Steel material. The radius of the entire cylindrical sections 91 and 85 is 109 inches. The calculated Tresca Stress of the seal joint 80 is 63.1 ksi at the point indicated at 81 and 134.1 ksi at the point indicated at 82. On the other hand, the calculated Tresca Stress of the seal 90 is 59.5 ksi indicated at 101 and 92 ksi indicated at 102. The calculated Maximum Tresca Stress for joint 80 is 134.1 ksi while it is 92 ksi for joint 90.

In accordance with requirements for ASME Boiler and Pressure Vessel Code Section III, the seal 80 can only operate 136 cycles while the seal 90 can operate 702 cycles. In other words, the seal 90 of the present invention lasts five times longer than the seal 80 of the prior art. Typically a plant operates 500 cycles of heating-up and cooling-down. Accordingly, the seal 80 is not a permanent seal since it only lasts for 136 of these cycles. In contrast, the seal 90 lasts for 702 cycles, well beyond the life of the plant. Thus, the seal according to the present invention requires no maintenance or inspection. Further, the seal is not subject to leakage and is not subject to degradation since it is designed from metal. Moreover, the seal of the present invention reduces the seal's joint stress and, as a result, can accommodate greater radial, axial and rotational movements of the vessel and has a useful life as long as the life of the plant.

In addition, it should be recognized that the seal arrangement of the present invention can accommodate typical shielding and insulation systems.

Figure 9:
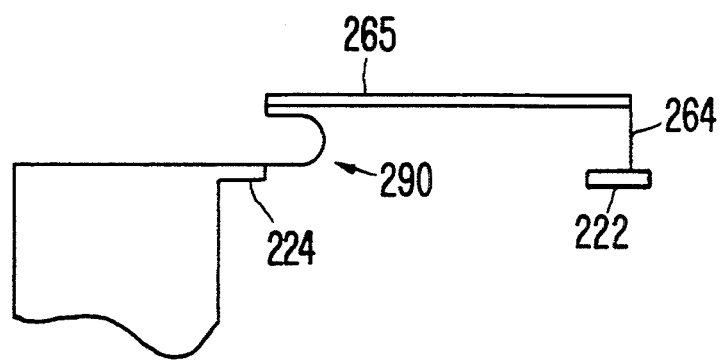
FIG. 9 is a cross-sectional view showing a second embodiment of the invention.
Figure 10:
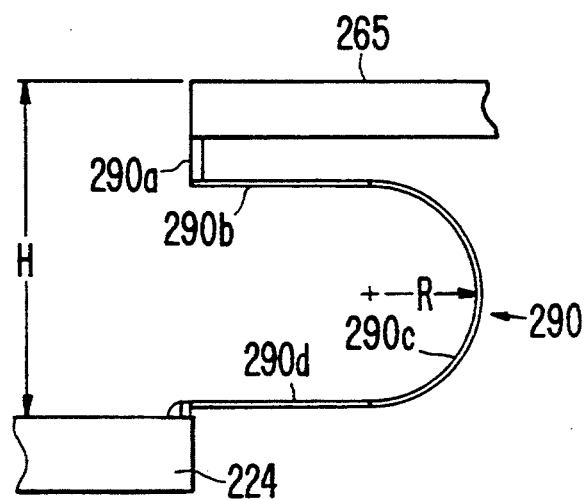
FIG. 10 and 11 are cross-sectional views which show the reverse C seal arrangement which characterizes the second embodiment of the present invention.
Figure 11:
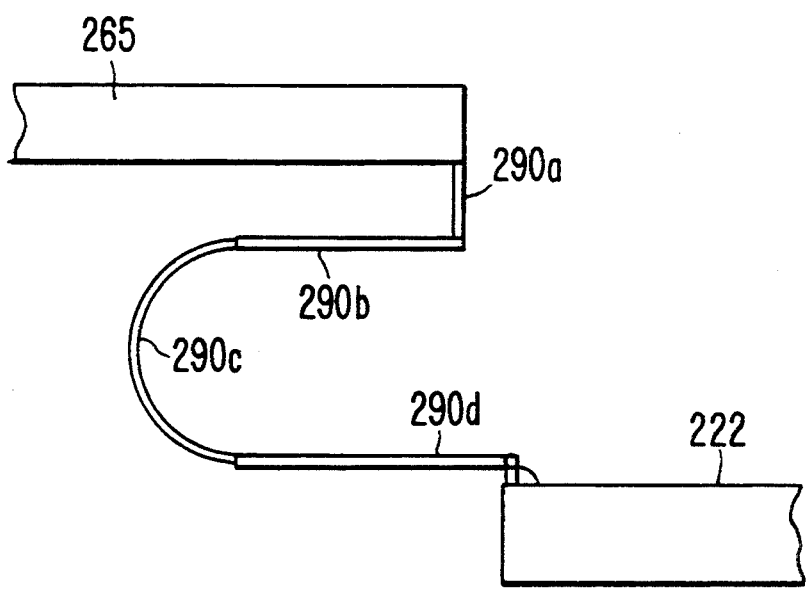

FIGS. 9 and 10 show a second embodiment of the present invention which features what shall be referred to as a "reverse C" flexible membrane 290 which interconnects the inboard edge of the annular platform 265 with the reactor vessel flange 224.

In this embodiment, the outboard edge of the platform 265 is supported by an essentially straight support member 264 which sealing interconnects the outboard edge of the annular platform 265 with the refuelling pool ledge 222. It will be noted at this point that although the outboard seal member is arranged below the annular platform 265 in the embodiment shown in FIGS. 9 and 10 for example, the present invention is not limited to this disposition and it is possible to arrange the seal above the deck and suspend the deck by way of the same in the event that it is desired for some reason, to arrange the deck at a level which is lower than one or both of the ledge 222 and the flange 224.

The reverse C seal is, as best appreciated from FIG. 10, such as to have a C-shaped cross-sectional portion which extends outwardly away from the rector vessel over the annular gap defined between the reactor vessel 10 and the pool floor 23 to define a concave corrugation. More specifically, the seal arrangement has a first relatively short vertically oriented wall portion 290a, a horizontally extend wall portion which extend inwardly in an essentially parallel relationship with the lower surface of the annular platform 265, a relatively flexible "C-shaped" portion 290c, and a second essentially horizontal wall portion 290d connecting the lower end of the C-shaped portion 290c with the flange 224.

The size of the reverse C seal portion of the membrane is larger than those of the first embodiment and is selected so that the vertical opening defined at the mouth of the C-shaped portion is well in excess of half the distance by which the platform 265 is located above the upper level of the flange 224 and the pool ledge 222. By way of example, in the event that the clearance H between the upper surface of the platform 265 and the upper surface of the annular vessel flange 224 is about 9 inches, the radius R of the C-shaped portion 290c is selected to be about 3 inches. This of course means the height of the mouth defined between the two horizontally extending wall portions 290b and 290d is about 6 inches.

In this embodiment the platform 265 is arranged to have a width which is at least equal to the width of the gap 228 and in this instance in excess of the latter, so that it may extend completely over the top of the gap.

Tests conducted with this second embodiment showed that the second embodiment could accommodate relative motions between the reactor vessel and the containment floor in the vertical, radial and horizontal directions with the generation of stress sufficiently low as to meet the ASME Code elastic criteria. This embodiment therefore represents a highly practical form of the invention with a large range of application.

The foregoing description of the preferred embodiments of the invention has been presented for purposes of illustration and description. It is not intended to be exhaustive or to limit the invention to the precise forms disclosed. Many modifications and variations are possible in light of the above teaching. The embodiments were chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

We claim:

1. A permanent seal for providing an effective water barrier over an annular space between a nuclear reactor vessel flange and a surrounding annular ledge comprising:
- an annular space-spanning deck structure which has a width at least equal to the width of said annular space;
- a first annular seal member for providing a seal between said deck structure and the surrounding annular ledge; and
- a second flexible annular seal member for providing a seal between said deck structure and the vessel flange and wherein a first portion of said second seal member is straight walled and a second portion of said second seal member is force absorbing.

2. The seal according to claim 1, wherein said first straight walled portion of said second seal member is arranged normally with respect to said annular space-spanning deck structure.

3. The seal according to claim 1, wherein said first straight wall portion of said second seal member is arranged parallel with a surface of said annular space-spanning deck structure.

4. The seal according to claim 1, wherein said second force absorbing section of said second seal member is an arcuately-shaped wall section.

5. The seal according to claim 4, wherein said arcuately-shaped wall section of said second seal member is composed of at least one corrugated section.

6. The seal according to claim 5, wherein said arcuate section of said second seal includes two corrugated sections.

7. The seal according to claim 1, wherein said straight wall section of said second seal member is sealed to said deck structure and said force absorbing portion of said second seal member is sealed to the vessel flange.

8. The seal according to claim 1, wherein said deck structure further comprises hatches which may be opened to provide access to and ventilation of the reactor vessel cavity below the vessel flange and surrounding annular ledge.

9. The seal according to claim 1, wherein the material for the second seal member is metal.

10. The seal according to claim 9, wherein said metal is stainless steel.

11. The seal according to claim 9, wherein the material for said deck structure and said first seal member is metal.

12. The seal according to claim 11, wherein the material for said deck structure, said first seal member and said second seal member is stainless steel.

13. A permanent seal for providing an effective water barrier over an annular space between a nuclear reactor vessel flange and a surrounding annular ledge comprising:
- an annular space-spanning deck structure, said annular space-spanning deck structure having a width which is at least equal to a width of said annular space;
- a first annular seal member for providing a seal between said deck structure and the surrounding annular ledge; and
- a second flexible annular seal member for providing a seal between said deck structure and the vessel flange and wherein a portion of said second seal member is a straight walled cylinder and another portion of said second seal member is arcuate and sufficiently flexible to allow relative movement between said flange and said annular ledge.

14. The seal according to claim 13, wherein said arcuate section of said second seal member is corrugated.

15. The seal according to claim 13, wherein said arcuate section of said second seal member is composed of at least one corrugation.

16. The seal according to claim 13, wherein said arcuate section includes two corrugations.

17. The seal according to claim 13, wherein said straight wall cylindrical section of said second seal member is sealed to said deck structure and said arcuate portion of said second seal member is sealed to the vessel flange.

18. The seal according to claim 13, wherein said deck structure further comprises a plurality of hatches which may be opened to provide access to and ventilation of the reactor vessel cavity below the vessel flange and surrounding annular ledge.

19. The seal according to claim 13, wherein the material for the second seal member is metal.

20. The seal according to claim 20, wherein said metal is stainless steel.

21. The seal according to claim 17, wherein the material for said deck structure and said first seal member is metal.

22. The seal according to claim 21, wherein the material for said deck structure, said first seal member and said second seal member is stainless steel.

23. A seal arrangement for sealing an annular space between a nuclear reactor vessel flange and a surrounding annular ledge comprising:
- an annular partition member, the distance between an inner edge and an outer edge of said partition member being equal to or greater than a distance between the vessel flange and the annular ledge;
- first seal means for providing a seal between said annular partition member and the surrounding annular ledge; and
- second flexible annular seal means for providing a seal between said annular partition member and the vessel flange, a portion of one of said first seal means and said second seal means having a C-shaped cross-section portion which is connected to a respective one of said annular ledge and said vessel flange by a straight walled member, said relatively flexible C-shaped cross-section portion being flexible to allow relative movement between said vessel flange and said annular ledge.

* * * * *